United States Patent [19]
Verhoog et al.

[11] Patent Number: 5,741,612
[45] Date of Patent: Apr. 21, 1998

[54] ELECTRODE PLATE FOR AN ELECTROCHEMICAL CELL AND HAVING A METAL FOAM TYPE SUPPORT, AND A METHOD OF MANUFACTURING SUCH AN ELECTRODE PLATE

[75] Inventors: Roelof Verhoog; Donald Stewart, both of Bordeaux, France

[73] Assignee: SAFT, Romainville, France

[21] Appl. No.: 855,898

[22] Filed: May 12, 1997

Related U.S. Application Data

[63] Continuation of Ser. No. 665,504, Jun. 18, 1996, abandoned, which is a continuation of Ser. No. 267,236, Jun. 29, 1994, Pat. No. 5,578,397.

[30] Foreign Application Priority Data

Dec. 17, 1993 [FR] France .................... 93 15253

[51] Int. Cl.$^6$ .......................... H01M 4/70; H01M 4/80
[52] U.S. Cl. .................... 429/235; 429/233; 29/2; 29/623.1
[58] Field of Search ................ 29/2, 623.1; 429/233, 429/235

[56] References Cited

U.S. PATENT DOCUMENTS

| | | | |
|---|---|---|---|
| 2,544,112 | 3/1951 | Schneider | 429/235 |
| 3,345,213 | 10/1967 | Lambert et al. | 29/2 |
| 3,835,514 | 9/1974 | Pollack | 429/235 |
| 5,077,153 | 12/1991 | Grange-Cossou et al. | 429/211 |
| 5,131,920 | 7/1992 | Moriwaki et al. | 29/623.1 |

FOREIGN PATENT DOCUMENTS

| | | |
|---|---|---|
| 0418774A1 | 3/1991 | European Pat. Off. . |
| 62-136759 | 6/1987 | Japan . |
| 62-139251 | 6/1987 | Japan . |

OTHER PUBLICATIONS

Sax & Lewis, editors *Hawley's Condensed Chemical Dictionary*, 11th edition, Van Nostrand Reinhold, publishers. 1987, p. 352 no month available.
French Search Report FR9315253, Sep. 1994.

*Primary Examiner*—Prince Willis, Jr.
*Assistant Examiner*—Carol Chaney
*Attorney, Agent, or Firm*—Sughrue, Mion, Zinn, Macpeak & Seas, PLLC

[57] ABSTRACT

An electrode plate including an active portion pasted with active material and a plate head including a connection tab. The plate head is constituted by the same metal foam as the plate support, but the density of the metal foam in the plate head is not less than 2.5 times the density of the metal foam in the remainder of the electrode plate, the higher density of the plate head coming from an operation in which the foam of the support is compressed, the tab of the plate head emerging from the middle of the thickness of the plate and being derived from compression of the support in two directions: compression firstly in the direction of its height; and compression secondly in the direction of its thickness. Such an electrode plate is made from a plate of metal foam whose top edge is compressed so as to form the plate head. Compression takes place in the height direction and then in the thickness direction for the tab, and for the remainder of the length of the electrode, compression takes place at least in the height direction.

5 Claims, 5 Drawing Sheets

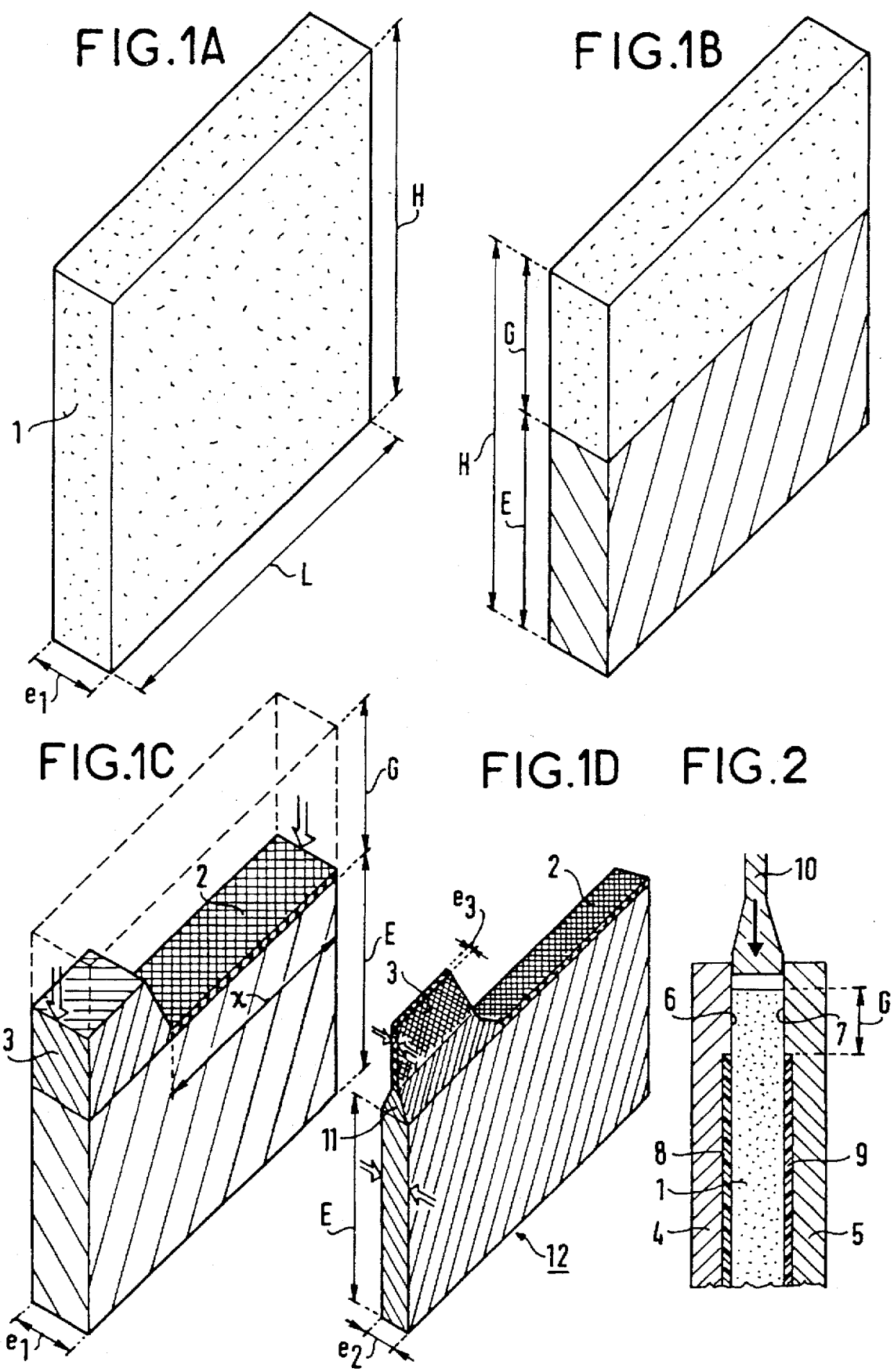

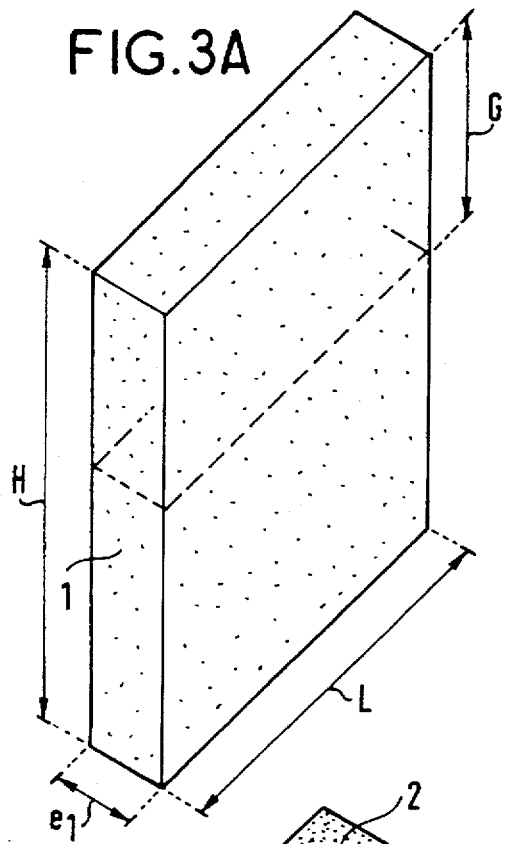
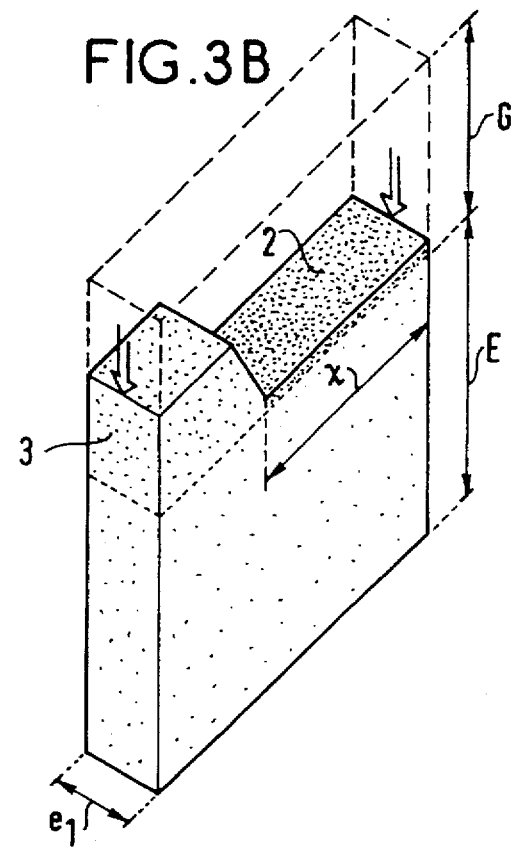
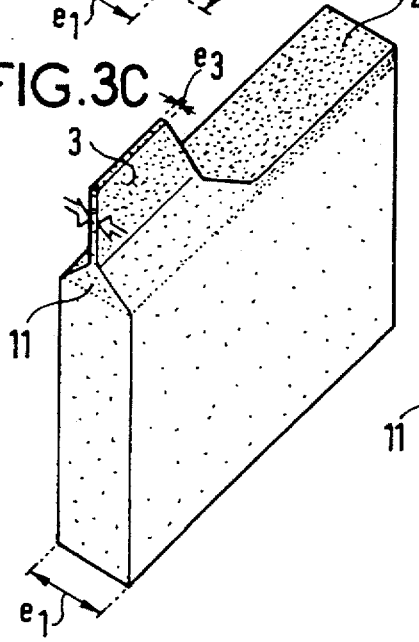
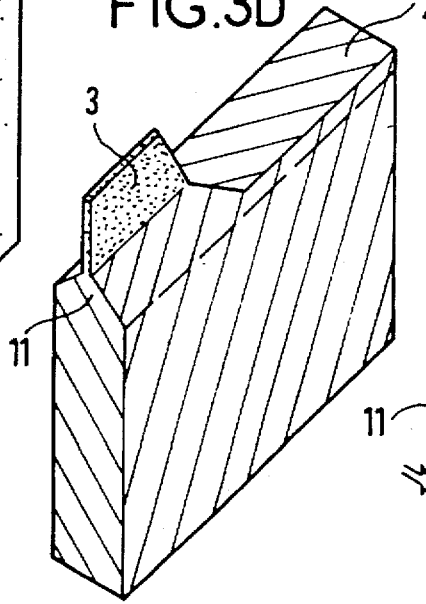
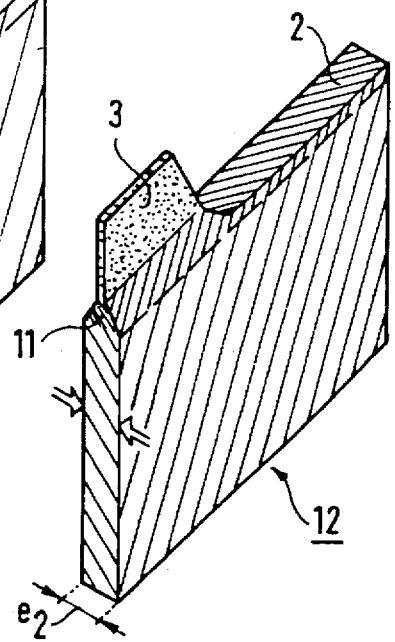

ELECTRODE PLATE FOR AN ELECTROCHEMICAL CELL AND HAVING A METAL FOAM TYPE SUPPORT, AND A METHOD OF MANUFACTURING SUCH AN ELECTRODE PLATE

This is a continuation of application Ser. No. 08/665,504 filed Jun. 18, 1996 abandoned May 12, 1997 which is a Continuation of application Ser. No. 08/267,236, now U.S. Pat. No. 5,578,397 filed Jun. 29, 1994.

The present invention relates to an electrode plate for an electrochemical cell and having a metal foam type support, and to a method of manufacturing such an electrode plate.

BACKGROUND OF THE INVENTION

The invention relates in particular to electro-chemical cells having an alkaline electrolyte in which at least one electrode includes a porous support made of metal, e.g. nickel, that is filled with active material, e.g. based on nickel hydroxide.

Such a porous support has a matrix structure comparable to a sponge in which the cells are connected to one another in a three-dimensional array, and it is referred to by the term "foam".

Before being filled with active material, the porosity of the foam of a support is greater than 90%. In its initial state, the thickness $e_1$ of the foam used generally lies in the range 0.5 mm to 5 mm, depending on the application. After being filled, the thickness of the support is reduced, e.g. by compression or by rolling, to a thickness $e_2$ that ensures good electro-chemical operation. At most, the above thickness reduction causes the initial thickness of the support to be halved.

An electrode plate of the above type is connected to a terminal of the cell via the head of the plate which includes an electrode connection zone. The connection zone is subsequently connected to said terminal by various means, e.g. screws or welding.

Problems arise in the making of a connection zone for an electrode having a foam type support: the connection zone must have adequate mechanical strength, must be a good conductor of electricity, must not make the plate heavy, and must be simple and cheap to make.

Various solutions exist for making the connection zone. These include, for example, riveting, stapling, or welding a metal part to the foam of the support; they also include taking a tongue made of a foam of the same kind but unfilled, and compressing it against the foam of the support after it has been filled with active material, and leaving a projecting tab, as described in document EP-A-0 418 774, for example. That solution is fragile and does not provide excellent electrical conduction in the head of the plate. Furthermore, none of the above solutions provides full satisfaction and they are all expensive.

OBJECTS AND SUMMARY OF THE INVENTION

An object of the present invention is to provide an electrode plate that ensures good electrical conductivity for the head of the plate and for its connection zone, while also providing good mechanical strength to the head of the plate and its connection zone. The invention also proposes a method of manufacturing such electrodes, which method is simple and cheap.

The present invention thus provides an electrode plate for an electrochemical cell and having a metal foam type support, the plate comprising an active portion pasted with active material and a plate head that includes a connection tab, wherein said plate head is constituted by the same metal foam as said support, without adding any additional parts or additional strips of metal foam, the density per unit area of the metal foam in said plate head being at least 2.5 times its density in the remainder of the electrode, the greater density of the plate head coming from an operation in which the foam of the support is compressed, said tab and said plate emerging from the middle of the thickness of said plate and being the result of compressing said support in two directions: a first compression in the plane of the electrode and in the height direction thereof; and a second compression perpendicular to the plane of the electrode and in the thickness direction thereof.

In a particular embodiment, the portion of the plate head that lies outside said connection tab has porosity that is as close as possible to 0% as achieved by maximum crushing of the initial foam of the support in the height direction of the electrode.

According to another characteristic, the free top end of said connection tab includes a portion of thickness greater than the remainder of said tab.

The invention also provides a method of making an electrode plate as defined above, wherein, starting from a plate of said support of length L, of height H, and of thickness $e_1$, the following steps are performed:

a—said support is filled with active material from the bottom up to a height of H-G;

b—the non-filled portion, constituting a strip initially of height G is compressed in the height direction, i.e. in the plane of the support; and c—the entire support is compressed in the direction of its thickness $e_1$, said compression being incomplete in the portion thereof that is filled with active material so as to give rise to a thickness $e_2$, and being maximal in at least the major portion of the remaining height of said strip, running from the filled portion, while nevertheless leaving a transitional portion between said incompletely compressed filled portion, and said maximal compression of at least the major fraction of the remaining height of said strip.

Before pasting, a variant of the method begins by performing the following steps:

a—a strip of said support of initial height G is compressed in the height direction, i.e. in the plane of the support;

b—at least the major fraction of the remaining height of said strip as compressed in above operation a is maximally compressed in its thickness direction, running from the non-compressed portion and leaving a transitional portion between said non-compressed portion and said maximal compression of the major fraction of the height of said strip;

c—the entire non-compressed portion of said support together with said transitional portion thereof is filled with active material; and d—the entire portion of the support that is filled with active material in operation c is compressed in part.

In a first advantageous implementation of the method applicable to both of the above cases, i.e. both in the case where the support is filled with active material before any compression operation and in the other case where it is filled with active material only after the head of the plate has been compressed in the thickness direction, said compression in the height direction of said strip of initial height G is maximal over a fraction x of the length L of the support and partial over the remaining portion forming a tab constituting said connection zone.

In another implementation, also applicable to both variants of the method, said compression in the height direction of said strip of initial height G is uniform partial compression over the entire length L of the support.

Then, after the strip has been maximally compressed in the direction of its thickness, a portion thereof is cut off so as to leave remaining only a tongue that constitutes the connection tab.

Said strip is compressed in the thickness direction from either side of said initial support so that the connection tab emerges from the middle of the thickness of the electrode plate, thereby avoiding short circuits between plates of alternating opposite polarities during assembly of the plates.

BRIEF DESCRIPTION OF THE DRAWINGS

Other characteristics and advantages of the present invention appear from the following description of implementations of the invention given below with reference to the accompanying drawings, in which:

FIGS. 1A to 1D show different steps in a first variant of the method giving rise to an electrode plate of the invention (FIG. 1D);

FIG. 2 is a diagram of the means used for compressing the support in its own plane in the height direction of the electrode plate;

FIGS. 3A to 3E show different steps in a second variant of the method giving rise to an electrode plate of the invention (FIG. 3E);

MORE DETAILED DESCRIPTION

Figure 4A:
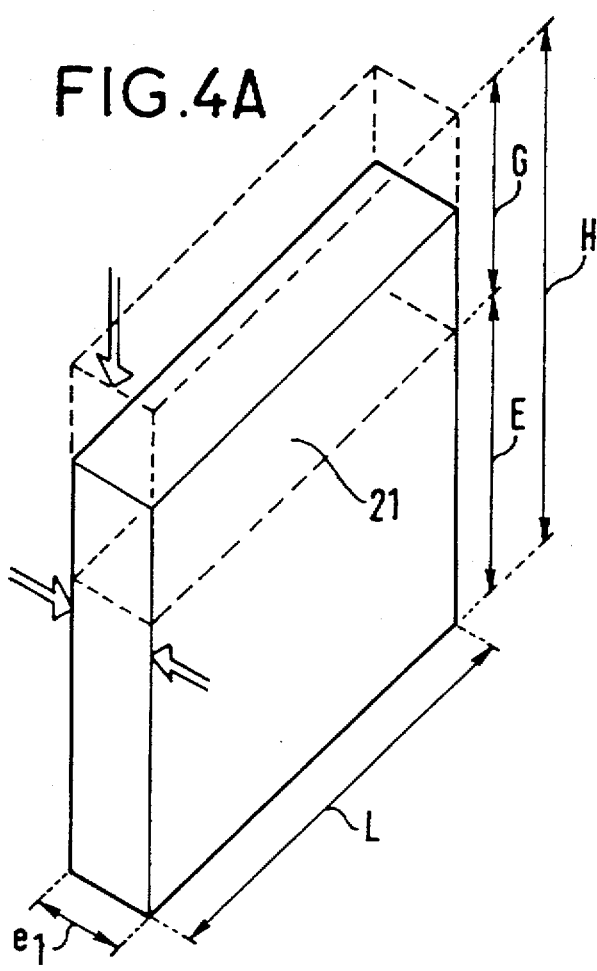
FIGS. 4A and 4B show another variant in which the plate head portion outside the connection tab is made by compression in the height direction and then by compression in the thickness direction, followed by cutting out.

With reference to FIGS. 1A to 1D, the steps of a first method of obtaining an electrode plate of the invention are now described. The method begins by taking a support plate 1 made of foam metal, e.g. nickel, having 95% porosity and a density or weight per unit area equal to $d_1$. Its length is L, its height is H, and its thickness is $e_1$.

Naturally, throughout the text below, whenever reference is made by way of example to making an electrode plate of length L, it will be clearly understood that the methods described apply identically to making a strip of great length for use in continuous manufacture of a plurality of plates of length L, with said plates being cut from said strip of great length after all of the steps of the manufacturing method have been performed thereon.

The plate 1 is then pasted (FIG. 1B) with active material over a height E while leaving a non-pasted guard height G.

Thereafter FIG. 1C, the non-pasted strip of initial height G is compressed in the plane of the support plate 1 in the height direction H. Over a length x of the plate, this strip of height G is maximally compressed, so that the porosity of the metal foam in the remaining height of the strip G (after it has been compressed and given reference 2 in its compressed state) is close to 0% and its density is more than four times greater the density of the initial foam. In contrast, over the remainder of the plate, of length L-x, the compression is such that the density or weight per unit area of the compressed foam is about 2.5 times the density or weight per unit area of the initial foam. This gives rise to a tab 3.

FIG. 2 is a diagram of small tooling for performing said compression operation in the plane of the plate. Two flat jaws 4 and 5 are used whose facing surfaces 6 and 7 have as low a coefficient of friction as possible over a height of not less than G, whereas, in contrast, over the remainder of their height, the facing surfaces 8 and 9 have a coefficient of friction that is high. The plate 1 is clamped between these two jaws so as to project over a height G above the top edges of the surfaces 8 and 9 having a high coefficient of friction. The above disposition makes it possible, during compression by means of a tool 10, to compress the support plate 1 only over the fraction G of its height, and to do so in a manner that is substantially homogeneous over the height of said fraction.

After the above operation of compression in the direction of the height H of the platform shown by the arrows in FIG. 1C, compression is performed in the thickness direction of the plate, as shown by the arrows in FIG. 1D.

The thickness compression takes place in part over the pasted height E of the plate. The purpose of such compression is to ensure good electrochemical performance of the plate. This compression divides the initial thickness $e_1$ of the plate by not more than two. This gives rise to a final thickness $e_2$. For example, the final thickness $e_2$ may be 1 mm if the initial thickness $e_1$ is 1.8 mm.

In contrast, the tab 3 is maximally compressed from both faces of the plate 1 so that its porosity is made as small as possible. The tab emerges from the middle of the thickness $e_2$ of the plate. Naturally, a transitional portion 11 exists in the tab 3 where its thickness tapers from the thickness $e_2$ to the maximally crushed thickness $e_3$. By way of example, the thickness $e_3$ may be 0.2 mm.

As can be seen in FIG. 1D, this gives rise to an electrode plate 12 comprising an active portion that is pasted with active material over a height E and that includes a plate head 2, 3, 11. The plate head is integrally formed from the initial support plate 1 without any addition, either of further metal foam or of any other metal part. The plate head, in its high density portion 2 (of density about five times that of the initial foam) acts as a current collector, while the tab 3 Whose density is equal to about three times that of the initial foam also serves to provide good conduction of current and good mechanical strength.

Figure 5:
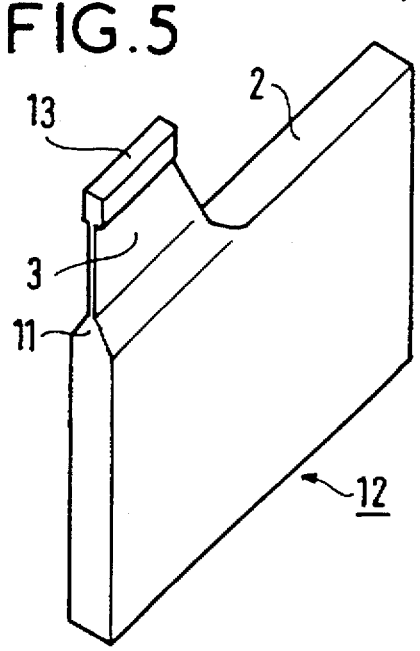
FIG. 5 shows an electrode of the invention in which the free end of the tab includes an enlarged portion.

While the tab 3 is being compressed in the thickness direction, it is possible to avoid compressing the free end of the tab maximally so as to obtain an enlarged portion 13, as can be seen in FIG. 5. Such an enlargement makes it possible to assemble tabs together by means of comb terminals, as can be seen in FIG. 6.

Figure 6:
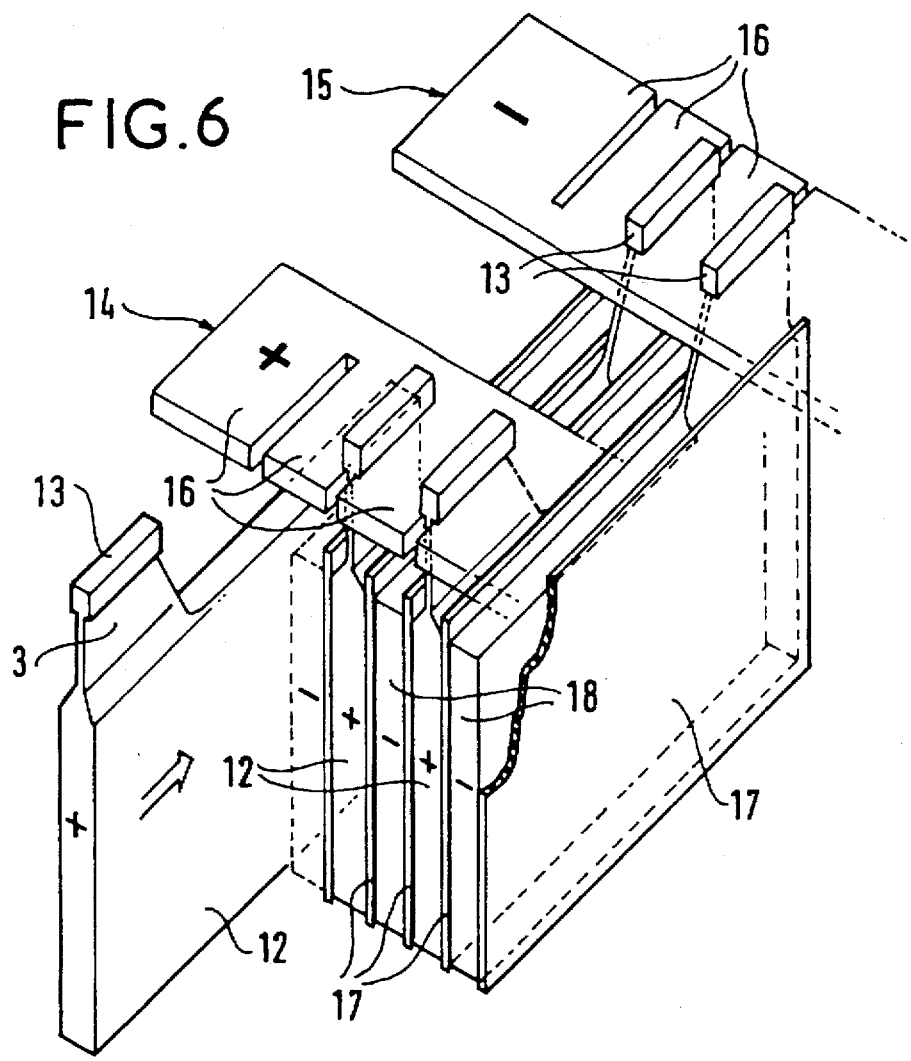
FIG. 6 shows how positive and negative electrode plates as shown in FIG. 5 are assembled together by being interconnected by means of positive and negative terminals having teeth.

In FIG. 6, there can be seen a positive terminal strip 14 and a negative terminal strip 15. These terminal strips have teeth 16. The plates are inserted between two adjacent teeth by means of their tabs 3, and the enlarged ends 13 thereof enable the plates to be retained by and welded to the terminal strips. Separators 17 insulate alternating positive and negative plates 12 and 18 from one another.

Figure 7A:
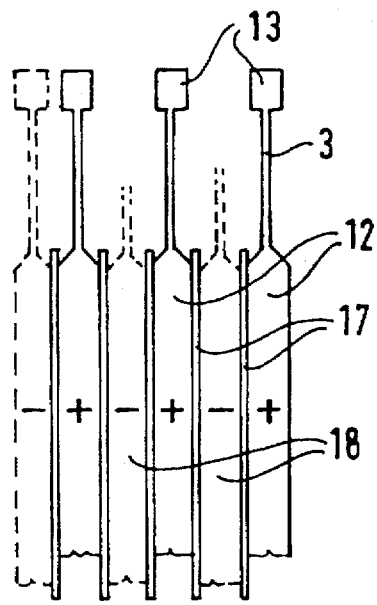
FIGS. 7A and 7B show a method of assembling together a plurality of positive and negative electrode plates as shown in FIG. 5 which are respectively assembled together by crushing together the enlarged portions of their tabs.
Figure 7B:
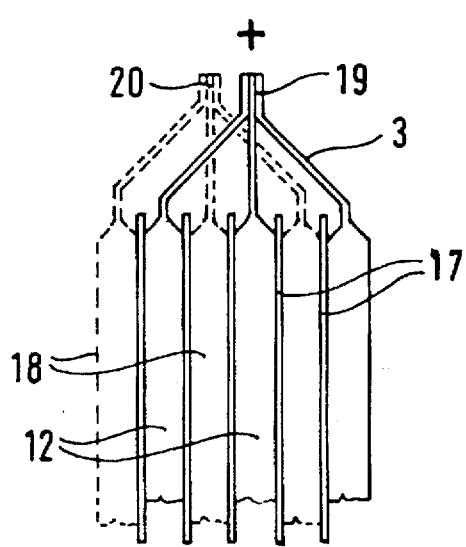

The enlargement 13 can also be used in a different assembly technique that is shown in FIGS. 7A and 7B. In this case, the positive and negative plates 12 and 18 are juxtaposed together with their insulating separators 17, after which all of the enlarged portions 13 of the same polarity are firmly clamped together. This gives rise to two connections 19 and 20 where the various tabs are held together by "Velcro" type mutual adhesion merely by crushing together their enlargements 13. In other words the free nickel fibers become mechanically entangled together.

If the ends of the tabs 3 of the electrode plates are not enlarged at 13 as shown in FIG. 1D, then the connection tabs are assembled to a terminal in conventional manner by welding, by means of a screw passing through a hole and associated with a washer, etc.

FIGS. 3A to 3E show the steps of a variant of the method as compared with the steps shown in FIGS. 1A to 1D.

The object of this variant is to obtain an electrode plate 12 in which the transitional portion 11 of the tab 3 is also filled with active material so as to stiffen the transitional zone. One of the effects of pasting this zone is to prevent any movement of the nickel fibers, thereby stiffening the plate head in this zone.

Thus, in this method, which starts likewise from a foam plate made of a metal such as nickel, of length L, of height H, and of thickness $e_1$ (FIG. 3A), instead of beginning by pasting the plate over a height E as in the previous method, the initial step (FIG. 3B) of this method consists in compressing the initial strip of height G in the height direction (as shown in FIG. 1C), with this step being performed in the same manner as before. Thereafter, as shown in FIG. 3C, compression is performed in the thickness direction on the tab 3 only, so as to obtain the final thickness $e_3$ (as shown in FIG. 1D). Thus, as in the preceding method, a transitional portion 11 is obtained, however, in this case the transitional portion 11 which previously gave rise to the final thickness $e_3$ of the tab 3 now runs from the full initial thickness $e_1$ of the plate support 1. Thereafter, as shown in FIG. 3D, the support 1 is pasted with the active material, thereby enabling said active material to penetrate also into the pores in the transitional zone 11. Finally, as shown in FIG. 3E, the entire plate is subjected to general compression so as to obtain the final thickness $e_2$ as before. This gives rise to the final electrode 12 of FIG. 3E which differs from that shown in FIG. 1D solely by the fact that the transitional zone 11 has been pasted, whereas this is not true in the plate 12 of FIG. 1D.

Figure 4B:
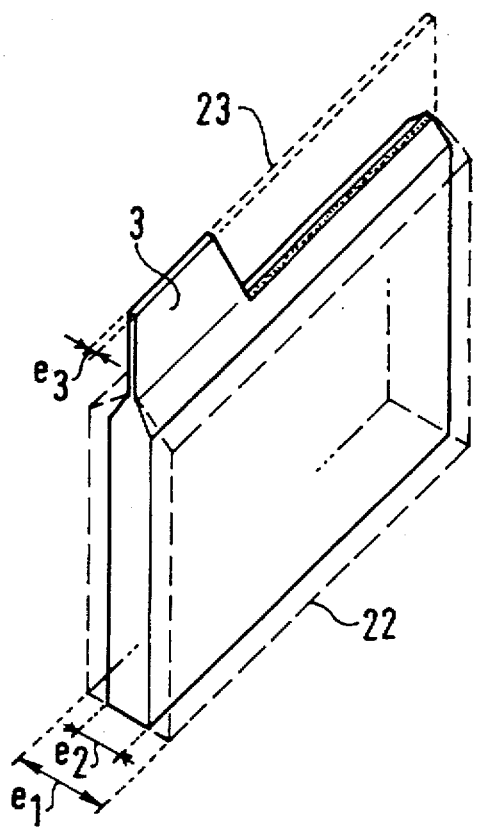

FIGS. 4A and 4B show a small variant applicable equally well to the method shown in FIGS. 1A to 1D where pasting is formed initially, and to the method shown in FIGS. 3A to 3E where pasting is performed only after the tab 3 has been made to its final thickness $e_3$.

In this variant, the initial height G of the support plate strip 1 is compressed in the height direction H (see FIG. 4A), i.e. the step corresponding to the steps shown in preceding FIGS. 1C or 3B, only partially and uniformly over the entire length L of the support plate. This partial compression corresponds to that performed in the preceding figures in the portion corresponding to the tab 3. This gives rise to a zone 21 in the form of a uniform strip whose density per unit area is about three times that of the remainder of the plate. Thereafter, compression is performed in the thickness direction either of said strip 21 alone so as to achieve the final thickness $e_3$, if pasting has not been performed previously and in which case, the thickness $e_1$ is temporarily conserved (as shown by dashed lines 22 in FIG. 4B), or else the entire plate is also compressed so as to achieve the final thickness $e_2$, if pasting has already been performed.

Once the plate has been completed, after pasting and overall compression to the thickness $e_2$ if that had not been done previously, the portion 23 shown in dotted lines in FIG. 4B is cut off so as to leave only the connection tab 3.

Figure 8:
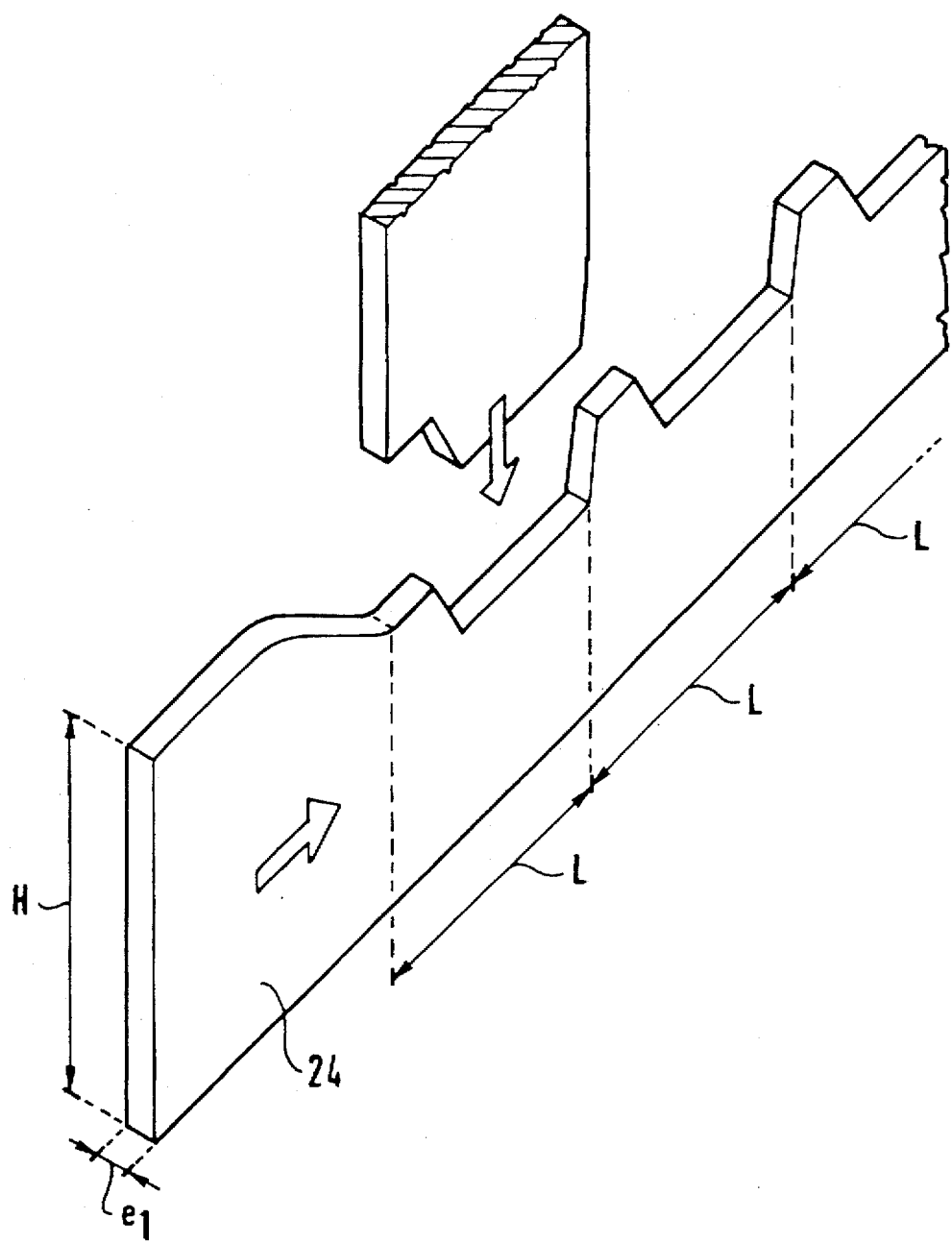
FIG. 8 is a perspective view showing how a plurality of electrodes can be made from a single strip.

As mentioned above, it is naturally possible in any of the variant methods described to manufacture a plurality of electrode plates of length L from a tape 24 of metal foam support having a thickness $e_1$ and a height H, with all of the operations of the method being performed on the strip, after which it is cut up into lengths L each corresponding to a single plate. This is shown in FIG. 8.

We claim:

1. An electrode plate for an electrochemical cell, said plate having a metal foam support and comprising: a first active portion pasted with active material; and a second portion forming a plate head comprising the same metal foam as said support, said plate head comprising a transitional portion, the density of the metal foam in said transitional portion being at least about 2.5 times the density of the metal foam in the remainder of said plate.

a connection tab emerging from the middle of the thickness of said plate, said connection tab having a porosity that is substantially equal to 0%, and an outer portion of the plate head that lies outside of said connection tab, the density of the metal foam in said outer portion of the plate head being at least about 2.5 times the density of the metal foam in the remainder of said plate.

2. An electrode plate as recited in claim 1, wherein said outer portion of the plate head that lies outside said connection tab is compressed in the height direction of the electrode so as to exhibit a porosity that is substantially equal to 0%.

3. An electrode plate as recited in claim 1, wherein a free end of said connection tab is compressed so as to exhibit a thickness greater than a thickness of the remainder of said tab for securing a plurality of electrodes together.

4. An electrode plate as recited in claim 1, wherein the density of said outer portion of the plate head that lies outside said connection tab is at least about 4 times the density of the metal foam in the remainder of said plate.

5. An electrode plate as recited in claim 1, wherein said connection tab is formed by the process of compressing said support in two directions, said process comprising the steps of: compressing said support in the height direction of the electrode; and compressing said support in the thickness direction of the electrode.

* * * * *